United States Patent Office 3,511,050
Patented May 12, 1970

3,511,050
TRANSDUCER FOR CONVERTING FLUID PRESSURE OSCILLATIONS INTO MECHANICAL OSCILLATIONS
John Taberner, Department of Mechanical Engineering, The University, Birmingham 15, England
Original application Jan. 3, 1966, Ser. No. 518,462. Divided and this application Sept. 13, 1968, Ser. No. 802,299
Int. Cl. F15b 7/00
U.S. Cl. 60—54.5          12 Claims

ABSTRACT OF THE DISCLOSURE

A transducer for converting fluid pressure oscillations into mechanical oscillators includes a relatively movable piston and cylinder, the opposed faces of the piston bounding first and second pressurized fluid-containing chambers in the cylinder. Relative oscillating movement of the cylinder and piston is controlled by a valve which, when opened, permits fluid flow to the appropriate chamber through a conduit. The conduit is connected to the other chamber through a flow regulator which maintains the algebraic mean pressure in the conduit greater than that in the other chamber.

---

This application is a division of application Ser. No. 518,462, filed Jan. 3, 1966, now abandoned.

This invention relates to a transducer for converting fluid pressure oscillations into mechanical oscillations.

The invention provides a transducer for converting fluid pressure oscillations into mechanical oscillations comprising a piston member in a cylinder, the piston member and cylinder being relatively movable, first and second opposing faces of the piston member bounding first and second chambers in the cylinder, each chamber being adapted to contain fluid under pressure, means for connecting the said first chamber to a source of oscillating pressure fluid to cause relative oscillating movement of the piston member and the cylinder, and ducting, the flow through which is controlled by valve means which are opened on excessive relative movement of the piston member and the cylinder in one sense, the valve means, when opened, permitting further pressure fluid to pass from a conduit and through the ducting to the appropriate said chamber to correct the said excessive relative movement, the said conduit communicating with the other chamber by way of a flow regulator valve which maintains the algebraic mean pressure of the further pressure fluid in the conduit greater than the algebraic mean pressure of the fluid in the said other chamber.

The flow regulator may be a non-return valve.

The conduit may communicate with the said second chamber by way of the said flow regulator valve.

Second valve means may be provided which are opened on excessive relative movement of the piston member and the cylinder in the opposite sense, said second valve means, when opened, venting the said appropriate chamber to a relatively low-pressure region, whereby further excessive relative movement in the said opposite sense is inhibited.

The transducer may comprise a spool valve connected by mechanical linkage to the piston member, the spool valve having a first land forming the first-mentioned valve means and a second land forming the said second valve means.

Alternatively, the piston member may form an operative part of the first-mentioned valve means.

The first mentioned valve means may be constituted by a drilling in the piston member which communicates with the said appropriate chamber and which, when the relative movement in the said one sense is excessive, communicates with a groove in the cylinder wall, said groove communicating with the said conduit.

The said appropriate chamber may be the first chamber.

The said conduit may also communicate with an auxiliary pressure fluid source which delivers make-up fluid to the transducer.

A pressure accumulator may be provided in the said conduit between the flow regulator valve and the first-mentioned valve means.

The second chamber may be adapted to contain fluid constituting a fluid spring.

The invention will be described, by way of example only, with reference to the accompanying drawings, in which.

Figure 1:
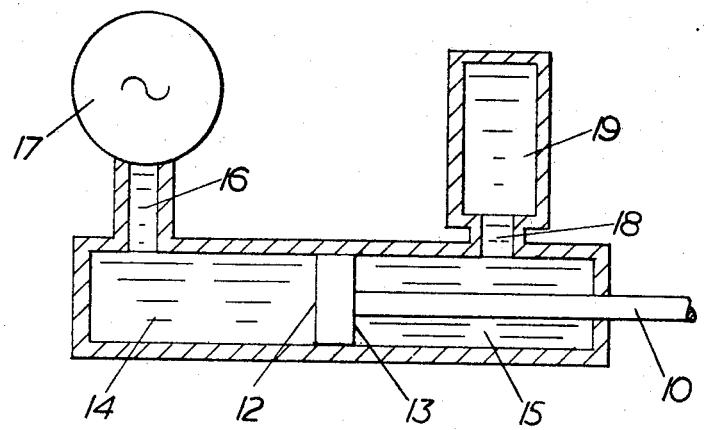
FIG. 1 is a diagrammatic sectional view of part of a transducer for use in the invention.

The chamber 15 of cylinder 11 communicates through a conduit 18 with a space 19. The chamber 15, the conduit 18 and the space 19 are also filled with the pressure-transmitting fluid so that the said fluid exerts a resilient force on the face 13 of the piston member 10. The volume of space 19 is large compared with the volume of chamber 15 of cylinder 11. The effective area of the face 13 is less than the effective area of the face 12.

The effect of applying fluid pressure oscillations to the face 12 of the piston member 10 is to cause the latter to oscillate mechanically, setting up fluid pressure oscillations in the chamber 15 of cylinder 11, and, through the conduit 18, in the space 19. These induced oscillations are applied to the face 13 of the piston member 10 by virtue of the effective resilience of the "liquid spring" constituted by the chamber 15, conduit 18 and the space 19. It is desirable to match these induced oscillations to those applied to the face 12 of the piston member, since in this resonance condition energy is converted from the fluid pressure oscillations of the source 17 into mechanical oscillations of the transducer with minimum energy loss. The resonance condition is achieved when the frequency of natural oscillation of the transducer equals the frequency of the applied fluid pressure oscillations.

To achieve the resonance condition referred to above, the total oscillating mass of the transducer, in this case the mass of the piston member 10, may be adjusted until the natural oscillation frequency thereof has the desired resonance value. Alternatively, or in addition the natural frequency of oscillation of the transducer may be adjusted by altering the volume of the space 19 (for example, by means of a screw plunger) to change the effective resilience of the liquid spring. At resonance, that is, when the transducer is matched to the applied fluid pressure oscillations, the amplitude of the mechanical oscillations of the piston member 10 will be a maximum.

By arranging that the area of face 13 in less than that of face 12, the displacement of fluid in the chamber 15 and space 19 compared with the displacement of fluid in chamber 14 is small when fluid pressure oscillations are applied, and, as a result, the peak pressure excursions in the portion 15 will be higher than those in the space 14. These two factors combined enable a space 19 of smaller volume than would otherwise be necessary to be employed.

The transducer shown in part in FIG. 1 uses the resilience of a "liquid spring," constituted by the chamber 15, conduit 18 and the space 19, effectively to reflect fluid pressure oscillations back to the face 13 of the piston member 10. An alternative transducer employs mechanical biassing means, in the form of a spring, and will be described with reference to FIGS. 2–4, in which the same reference numerals have been used to indicate parts corresponding to those of the structure of FIG. 1.

Figure 2:
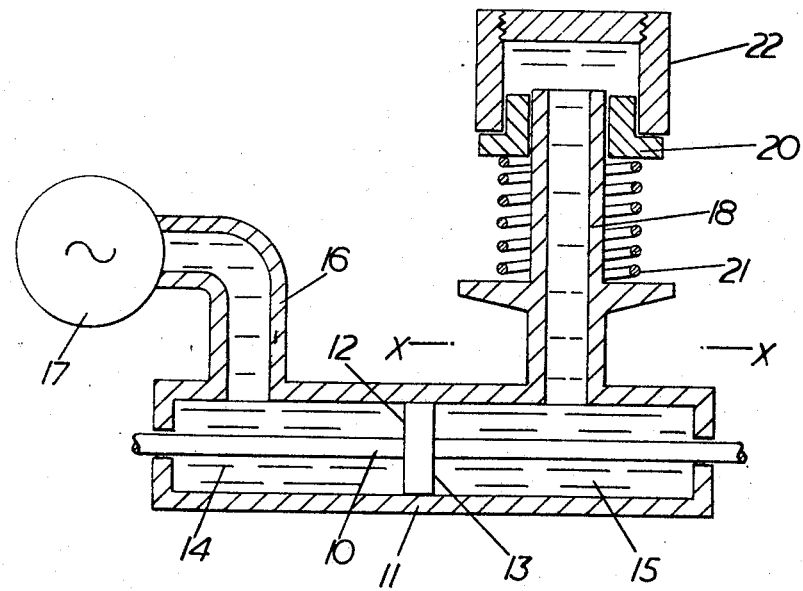
FIG. 2 is a diagrammatic sectional view of part of another transducer for use in the invention.

In the embodiment of FIG. 2 the piston member 10 has faces 12, 13 of equal effective area. The chamber 15 enclosed by the face 13 communicates through the conduit 18 with a pressure responsive member 20 which effectively seals the pressure transmitting fluid in the chamber 15 and the conduit 18. The pressure responsive member 20 is urged resiliently against the pressure exerted by the pressure-transmitting fluid by a spring unit 21. The effective resilience of the spring unit 21 may be adjusted by means of, for example, an axially adjustable screw-threaded member 22.

Figure 3:
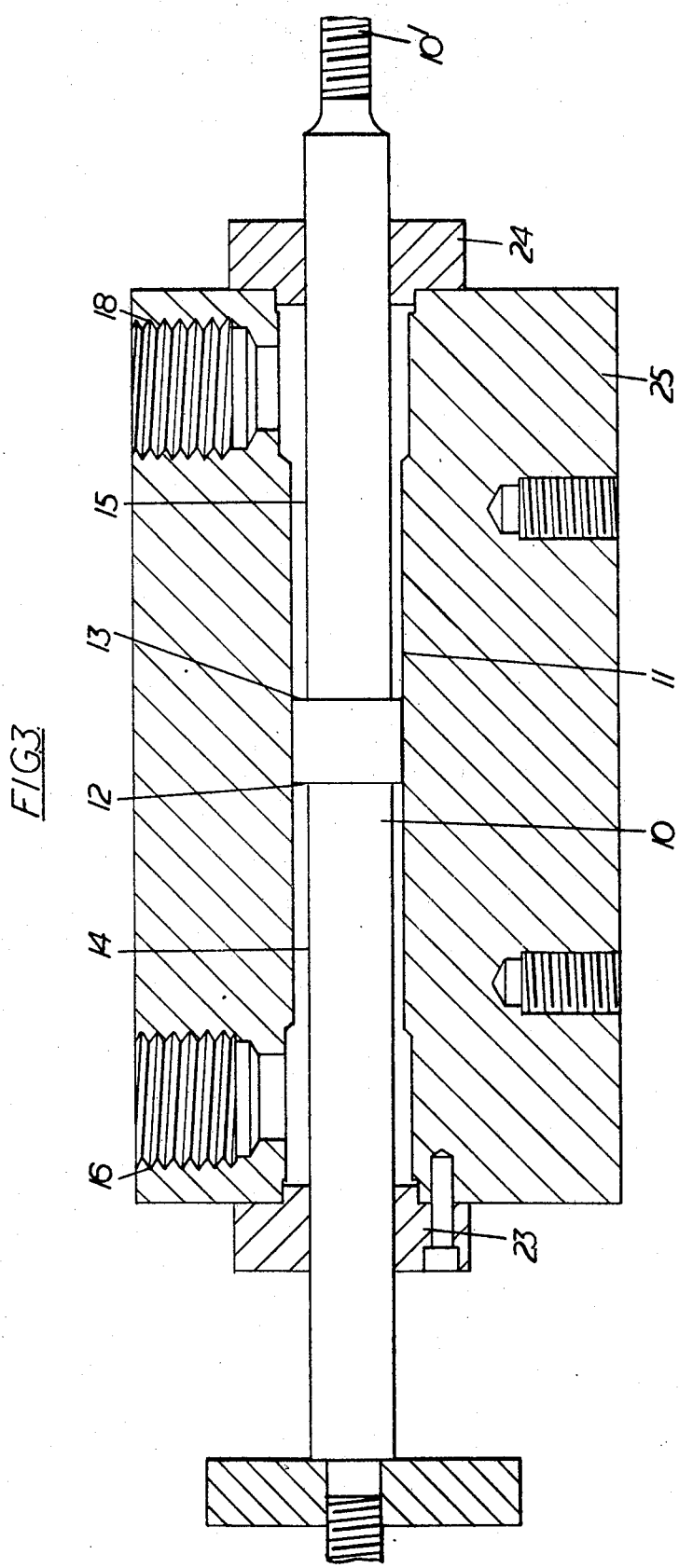
FIG. 3 is an axial section through the structure shown in FIG. 2.

The structure of FIG. 2 will be described in more detail with reference to FIGS. 3 and 4 which are respectively axial sections of the parts of the transducer disposed respectively below and above the chain-dotted line X—X of FIG. 2. In both FIG. 3 and FIG. 4 the reference numerals employed correspond to those used in FIG. 2, where applicable.

The piston member 10 (FIG. 3) passes through respective glands 23, 24 at opposite ends of the cylinder 11. A threaded end portion 10' at one end of the piston member 10 is adapted to carry a load (not shown) to which it is desired to transmit mechanical oscillations. The cylinder 11 is formed by a cylindrical bore made in a metal cylinder block 25.

Figure 4:
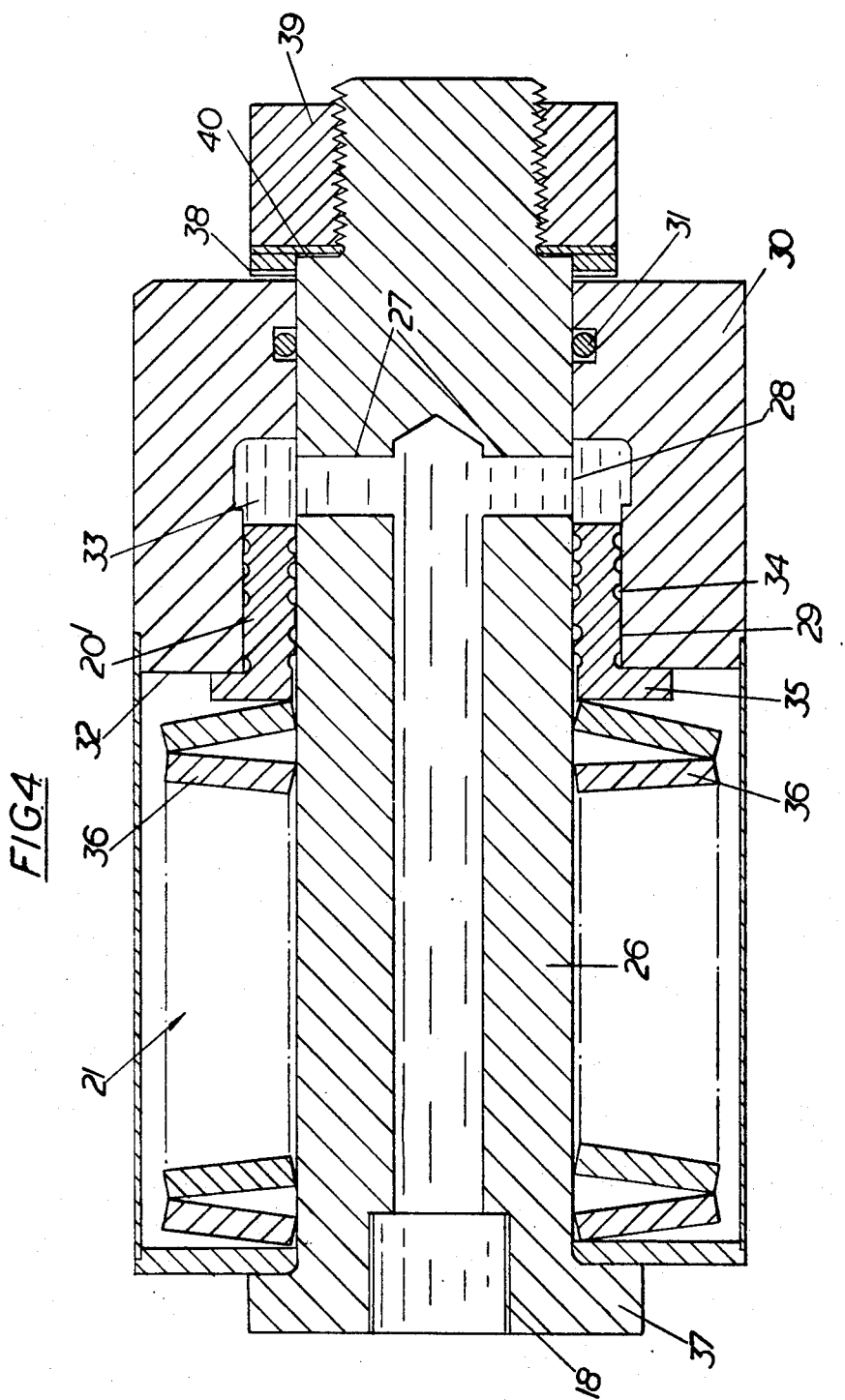
FIG. 4 is an axial section through another part of the structure shown in FIG. 2.

Referring to FIG. 4, it will be seen that the conduit 18 is provided by a drilling in a cylindrical block 26 of metal, which may, if desired, be integral with the cylinder block 25. Adjacent the closed end of the conduit 18 a number (for example, four) of branch conduits 27 communicating with the conduit 18 are provided, each branch conduit 27 communicating with the surface of the block 26 through apertures 28.

An annular thrust block 30 is a sliding fit over the block 26. A portion of the annular block 30 is provided with an enlarged bore 29 of larger diameter than the external diameter of the block 26, the bore 29 extending from one end 32 of the block 30 over approximately half the axial extent of the block 30. The enlarged bore 29 forms with the outer surface of the cylindrical block 26 an annular space 33. Each branch conduit 27 communicates with the annular space 33.

The pressure responsive member 20 in this embodiment is a hard metal annular piston 20' which is a sliding fit in the annular space 33. The inner and outer surfaces of the annular piston 20' are provided with circumferentially extending lubrication grooves 34. The end of the piston 20 projecting beyond the end face 32 of the block 30 is provided with a flange 35 extending radially outwardly of the bore 29. The flange 35 is urged into contact with the end face 32 by the spring unit 21.

The spring unit 21 comprises a stack of superimposed Belleville washers 36. The Belleville washers 36 are compressed between the flange 35 of the annular piston 20 and a flange 37 provided on the block 26. The biassing force to which the piston 20 is subjected is determined by the resilience afforded by the washers 36, which in turn is dependent on the amount by which the washers 36 are compressed. To adjust the effective resilience of the spring unit 21 in this case certain of the Belleville washers, as required, may be interchanged with solid metal washers (not shown).

The axial position of the thrust block 30 with respect to the block 26 is determined by the thickness of one or more annular shims 38 which are located about the cylinder block 26 between the block 30 and an axially movable nut 39. The nut 39 is threaded on one end of the cylinder block 26 and is screwed home against an axially facing shoulder 40. The overall thickness of the shims 38 is selected to give a desired pre-load to the Belleville washers 36.

The conduit 18, the branch conduits 27, and the space 33 are, of course, filled with hydraulic fluid (e.g. oil) under pressure. Leakage of fluid between the cylinder block 26 and the block 30 is checked by an O ring seal 31 located in an annular channel 31' in the block 30 between the space 33 and the shims 38.

It is arranged that the effective area of the pressure responsive member 20 is different from the effective area of the piston member 10. In the particular embodiment of FIG. 4, the area of the annular piston 20' is substantially greater than that of the face 13 the piston member 10. This results in a small travel of the annular piston member 20' in operation compared with the travel of the piston member 10, enabling the high load/small deflection characteristics of the Belleville washers to be exploited, leading to a more compact spring unit than would otherwise be the case, if the members 10 and 20' had equal effective areas, or if other types of spring were employed.

In operation, the fluid pressure oscillations applied to the face 12 of the piston member 10 are accompanied by flow oscillations in the fluid, with a typical amplitude of about 3 inches. When the piston member 10 is moved to the right in FIG. 2 during a positive pressure excursion in applied fluid oscillations, fluid flows from the chamber 15, through conduit 18 and branch conduits 27 to the annular space 33 above the pressure responsive member 20. The latter is therefore moved away from the end face 32 of the block 30, compressing the spring unit 21.

During negative pressure excursions of the applied oscillations the compressed spring unit 21 expands, forcing the member 20 towards the end face 32, and thereby giving up the elastic energy stored therein during the preceding positive excursion to the fluid in the space 33. Pressure is therefore applied to the face 13 of the piston member 10.

As in the embodiment of FIG. 1, resonance occurs if the natural frequency of oscillation of the transducer is made equal to the frequency of the applied fluid pressure oscillations. The natural frequency of the transducer may be adjusted in this embodiment by adjusting the effective resilience of the spring unit 21 as described above. Finer adjustment of the natural frequency is achieved by varying the oscillating mass of the transducer, which mass is made up in this case of the mass of the piston member 10 and an equivalent mass corresponding to the annular piston 20' oscillating with reduced amplitude.

Figure 5:
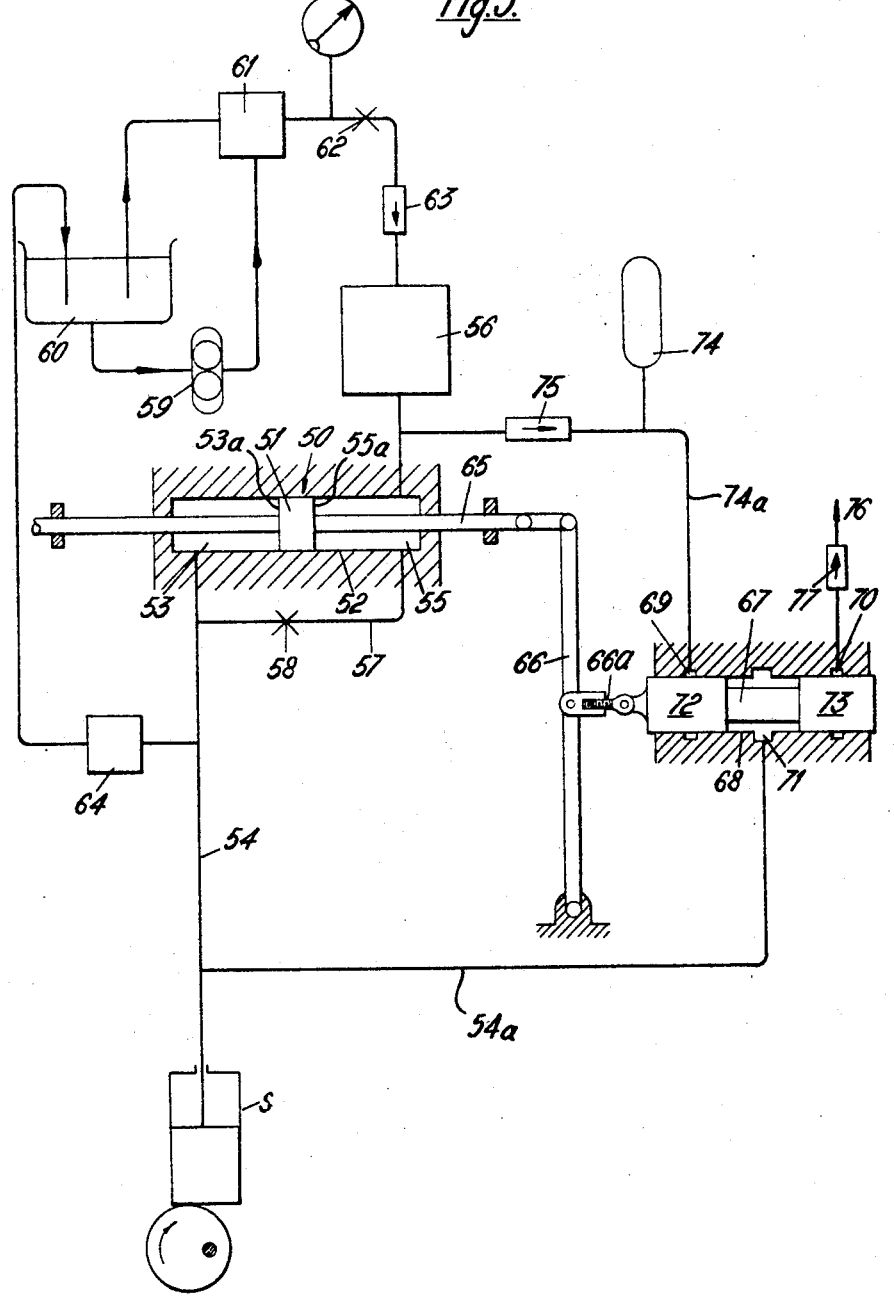
FIG. 5 illustrates diagrammatically a transducer of the invention, and apparatus associates therewith.

Referring now to FIG. 5 there is shown a transducer according to the invention, and apparatus associated therewith.

A transducer 50 comprises a piston member 51 slidably mounted in a cylinder 52. A first portion or chamber 53 of the cylinder 52 is bounded by a first face 53a of piston member 51, and is connected by a supply line 54 to a source of oscillating pressure fluid shown diagrammatically at S, thus producing relative oscillating movement of the piston 51 and cylinder 52. A second portion or chamber 55 of cylinder 52 is bounded by a second face 55A of piston member 51, and is connected to a chamber 56 filled with pressure fluid which constitutes a fluid spring. The transducer 50 is seen to embody features as shown in FIG. 2. The faces 53a, 55a are oppositely directly and the fluid forces thereon are thus in opposition. The area of face 55a is substantially equal to the area of face 53a, so that peak pressures in chambers 55 and 53 will be substantially equal.

A pressure balancing duct 57, which may be closed by means of a stop valve 58, interconnects the two chambers 53, 55 as described in our previous patent specification No. 1,038,832.

Pressure fluid is supplied to the system from an auxiliary pressure fluid source or backing-pump 59, which draws fluid from a reservoir 60 and which pressurizes the chamber 56 through a pressure reducing valve 61, a stop valve 62 and a non-return valve 63, A pressure relief valve 64 is connected to the supply line 54 and is arranged, when open, to connect the line 54 to the reservoir 60.

The piston member 51 has a piston rod extension 65 which is connected by a mechanical linkage 66 to a spool valve 67 which is a sliding fit in a valve housing 68. The housing 68 has a first circumferential groove 69 adjacent one end, and a second circumferential groove 70 adjacent the other end, and a central port 71 which is in direct communication by a ducting 54a with the supply line 54, and therefore with the chamber 53. The spool valve 67 has respective first and second lands 72, 73 at opposite ends which respectively co-operate with the first and second grooves 69, 70 to form first and second valve means. In the normal position of the valve 67 as shown, the respective lands 72, 73 cover the respective grooves 69, 70 of the housing 68.

The first groove 69 is supplied with fluid under pressure from a conduit 74a which is provided with a pressure fluid accumulator 74 which is pressurized from the chamber 56 through a flow regulating valve 75 of the non-return type.

The valve 75 is arranged to permit fluid flow from the chamber 56 to the conduit 74a when the pressure in the chamber 56 exceeds a predetermined value close to the maximum pressure occurring therein during operation, but to substantially prevent flow in the opposite direction. The pressure in the conduit 74a and the accumulator 74 will thus be maintained at a value, determined by the valve 75, which is close to the maximum pressure occurring in operation in the chamber 56, and is thus greater than the algebraic mean pressure in either chamber 53 or chamber 55. The second groove 70 is connected to a relatively low pressure drain 76 through a non-return valve 77.

The transducer and associated apparatus of FIG. 5 operates in the following manner. Should any leakage of fluid occur from the second cylinder chamber 55, the resulting fall in pressure will cause non-return valve 63 to open and the pressure fluid will be supplied to the chamber 56 from the pump 59. The pressure in the chamber 55 and the chamber 56 is therefore maintained automatically at a predetermined value, determined by the setting of valve 63.

Should leakage of fluid occur from the first cylinder chamber 53, the mean position of the piston member 51 will tend in operation to drift to the left in cylinder 52. When, however, the piston member moves excessively to the left relative to the cylinder and comes within a predetermined distance of the left-hand end of cylinder 52, the linkage 66 just causes the groove 69 of the valve housing 68 to be uncovered by the land 72 of the spool valve 67, with the result that the accumulator 74 and the conduit 74a are placed momentarily in communication with the chamber 53 via the ducting 54a and the supply line 54, thus causing the piston member 51 to be moved to the right, and thereby closing the first valve means 69, 72 again.

Thus excessive relative movement of thce the piston member 51 and the cylinder 53 in one sense opens the valve means 69, 72 permitting further pressure fluid to pass from the conduit 74a and through the ducting 54a to the appropriate chamber 53 to correct the said excessive relative movement.

Should, however relative movement between the piston member and cylinder in the opposite sense become excessive, i.e., the piston displacement become excessive towards the right, then the spool valve 67 will uncover the second groove 70 and the chamber 53 will become momentarily connected to the drain 76 via the supply line 54 and the ducting 54a, inhibiting further displacement to the right.

Thus further excessive relative movement of the piston member and cylinder in the opposite sense is inhibited by the second valve means 70, 73.

The linkage 66 includes an adjustable member 66a which permits adjustment of the position of the piston 51 at which the first valve means 69, 72 opens. The spool valve 67 therefore acts to limit the excursions of the piston member 51 both to the right and to the left in the cylinder 52, pressure fluid being supplied to the system automatically to compensate for any leakage from the transducer 50.

Figure 6:
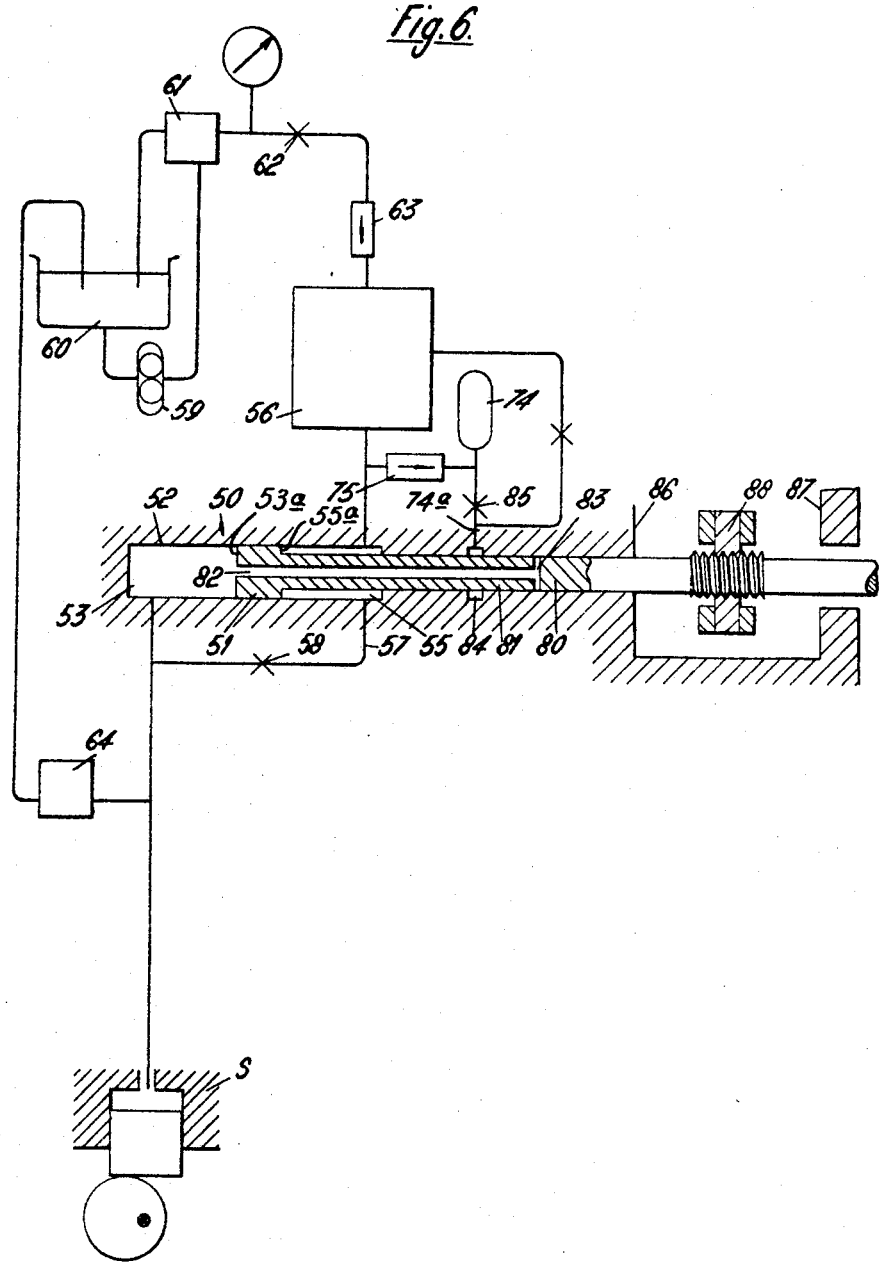
FIG. 6 illustrates diagrammatically a further transducer of the invention and apparatus associates therewith. The terms left and right refer to direction as seen in the drawings.

An alternative transducer and apparatus associated therewith is illustrated in FIG. 6, where the reference numerals employed correspond, where applicable, to those of FIG. 5. The piston member 51 is in this case of the differential area type, the piston face 53a bounding the left-hand cylinder chamber 53 being of larger effective area than the face 55a bounding the right-hand chamber 55.

The piston member 51 has an extended portion or stem 80 which is connected to a load such as a drilling tool (not shown) and which passes through a cylinder bore 81 at one end of the block in which the cylinder 52 is formed. The stem has a drilling 82 which communicates with the first cylinder chamber 53 and which also communicates with the bore 81 through two branch drillings 83. The drilling 82 is thus the equivalent of ducting 54a.

A circumferential groove 84 is provided in the wall of the bore 81. The groove 84, analogously to the groove 69 in FIG. 5, is connected to a source of fluid pressure comprising a conduit 74a and an accumulator chamber 74 pressurized from the chamber 56. A restrictor 85 is located between the accumulator 74 and the groove 84 to assist in smoothing fluid flow.

The operation of the transducer and associated apparatus of FIG. 6 will be apparent from the foregoing description. The main pressure in the system is maintained at a predetermined value by the backing-pump 59 and the non-return valve 63, as in the arrangement of FIG. 5. The limit of leftward excursion of the piston member 51 is determined in this case by the relative positions of the groove 84 and branch drillings 83, which together form a first valve means. When the piston member 51 moves to the left sufficiently to bring the groove 84 and drillings 83 into communication, the pressure fluid in the conduit 74a and accumulator 74, the pressure of which is higher than the algebraic mean pressure in the chamber 56 by virtue of the valve 75, is fed to the first cylinder chamber 53 through the drilling 82, and the piston member 51 moves to the right, thereby closing off the groove 84 again.

The amplitude of oscillation of the piston member 51 may be limited mechanically by providing fixed stops 86, 87 between which moves a buffer member 88, adjustably located on the piston stem 80.

The reciprocating weight of the piston member 51 and its associated load may be balanced by allowing the cylinder 52 to "float" in a soft suspension with suitable restraints. The load driven by the piston member 51 of the transducer according to the present invention may comprise, for example, a rock-drill bit, or moving parts of an agricultural implement, such as the blades of a grass cutting machine.

The reciprocating weight of the piston 51 and its associated load may be balanced by allowing the cylinder 52 to "float" in a soft suspension with suitable restraints. The load driven by the piston member of the transducer according to the present invention may comprise, for example, a rock-drill bit, a tine or group of tines of earth-moving equipment, or moving parts of an agricultural implement, such as the blades of a grass-cutting machine.

I claim:

1. A transducer for converting fluid pressure oscillations into mechanical oscillations comprising a piston member in a cylinder, the piston member and cylinder being relatively moveable, the cylinder having first and second chambers, first and second opposing faces of the piston member being respectively disposed in the first and second chambers, each chamber being adapted to contain pressure fluid, a source of oscillating pressure fluid, means for connecting the said first chamber to the said source of oscillating pressure fluid to cause relative oscillating movement of the piston member and the cylinder, a conduit adapted to contain further pressure fluid, ducting and valve means which are opened by the piston member on excessive relative movement of the piston member and cylinder in one sense, the valve means, when opened, permitting the further pressure fluid to pass from the conduit and through the ducting to the appropriate said chamber to correct the said excessive relative movement, a flow regulator value via which the said conduit communicates with the other chamber the flow regulator valve maintaining the algebraic mean pressure of the further pressure fluid in the conduit greater than the algebraic mean pressure of the fluid in the said other chamber.

2. A transducer as claimed in claim 1 in which the flow regulator valve is a non-return valve.

3. A transducer as claimed in claim 1 wherein the conduit communicates with the said second chamber by way of the said flow regulator valve.

4. A transducer as claimed in claim 1, comprising second valve means which communicate with a relatively low pressure region, and which are opened on excessive relative movement of the piston member and the cylinder in the opposite sense, said second valve means when opened, venting the said appropriate chamber to the relatively low pressure region.

5. A transducer as claimed in claim 4 comprising a spool valve, mechanical linkage connecting the spool valve to the pison member, the spool valve having a first land forming the first-mentioned valve means and a second land forming the said second valve means.

6. A transducer as claimed in claim 1, wherein the piston member forms an operative part of the first-mentioned valve means.

7. A transducer as claimed in claim 6 wherein the cylinder comprises a groove in the wall thereof, the groove communicating with the conduit, the first-mentioned valve means being constituted by a drilling in the piston member which communicates with the said appropriate chamber and which, when the relative movement in the said one sense is excessive, communicates with the groove.

8. A transducer as claimed in claim 1 wherein the said appropriate chamber is the first chamber.

9. A transducer as claimed in claim 1 comprising an auxiliary pressure fluid source adapted to deliver make-up fluid to the transducer, the conduit communicating with the auxiliary pressure fluid source.

10. A transducer as claimed in claim 1 wherein a pressure accumulator is provided in the said conduit between the flow regulator valve and the first-mentioned valve means.

11. A transducer as claimed in claim 1 wherein the second chamber is adapted to contain pressure fluid constituting a fluid spring.

12. Apparatus comprising a source of oscillating pressure fluid and a transducer according to claim 1 the source of fluid pressure oscillations being connected to the said first chamber, and a load being driven by the piston member.

References Cited

UNITED STATES PATENTS

| 2,623,384 | 12/1952 | Pigott | 60—54.5 XR |
| 2,667,146 | 1/1954 | Wheeler | 60—54.5 |
| 2,886,949 | 5/1959 | Matlachowsky | 60—54.5 |
| 3,242,675 | 3/1966 | Norton | 60—54.5 |
| 3,292,370 | 12/1966 | Foster et al. | 60—54.5 |

MARTIN F. SCHWADRON, Primary Examiner

R. R. BUNEVICH, Assistant Examiner

U.S. Cl. X.R.

92—134